IF CARRIER FM TRANSMISSION SYSTEM

Original Filed Aug. 14, 1962 3 Sheets-Sheet 1

INVENTORS
HARRY F. PISCHKE
NEAL VANN JR.
BY LeBlanc & Shur
ATTORNEYS

Aug. 1, 1967 H. F. PISCHKE ET AL 3,334,300

IF CARRIER FM TRANSMISSION SYSTEM

Original Filed Aug. 14, 1962 3 Sheets-Sheet 2

INVENTORS
HARRY F. PISCHKE
BY NEAL VANN JR.
LeBlanc & Shur
ATTORNEYS

INVENTORS
HARRY F. PISCHKE
BY NEAL VANN JR.
LeBlanc & Shur
ATTORNEYS 3,334,300
IF CARRIER FM TRANSMISSION SYSTEM
Harry F. Pischke and Neal Vann, Jr., Fort Lauderdale, Fla., assignors to Harmony of Fort Lauderdale, Inc., Fort Lauderdale, Fla., a corporation of Florida
Continuation of application Ser. No. 216,812, Aug. 14, 1962. This application Nov. 17, 1965, Ser. No. 513,642
4 Claims. (Cl. 325—45)

This application is a continuation of copending application Ser. No. 216,812, filed Aug. 14, 1962, now abandoned.

This invention relates to a system for transmitting audio frequency information, and more particularly relates to a transmitting and reception system which makes possible a high-fidelity transfer of audio frequency information utilizing a single transmission line operating against ground.

Systems for transmitting audio frequency information over wire conductors in the form of electrical energy have been known for many years. Perhaps the best known is the modern telephone system utilizing transmission both at audio frequencies and also at high carrier frequencies. In recent years systems of this type have also been employed to transmit wired background music to subscribers, usually commercial establishments. Other types of systems utilizing audio frequency transmission over wires have been common in connection with various type of remote control and information retrieval systems.

As is well known, high-frequency carrier systems suffer from severe limitations in a low-cost environment resulting from attenuation and impedance matching problems, among others, and the necessity for utilizing special type thigh-frequency conductors such as coaxial cables. As a consequence most of the wired music systems rely upon conventional telephone line pairs, usually leased from the telephone companying and transferring audio signals directly. While this system is generally satisfactory from a commercial and fidelity standpoint, the charges for the leased lines are not inconsequential and repersent a significant portion of the cost of establishing and maintaining a wired music service.

In the large number of telephone lines which the telephone companying has available, there are always a rather substantial number of imperfect pairs wherein one of the two transmission lines is broken or short-circuited so that the pair is unusable as a pair. While there has been a very limited usage of these single lines in so-called broken pairs, the usage has usually been relatively crude in nature so that the vast majority of such broken pairs remain unused. Because there is such little demand for such pairs, and such limited types of usage to which they may be put, the good wires in the broken pairs are made available by the telephone companying at a very substantially reduced rate.

According to the present invention, a transmission system has now been developed which permits utilization of the good line in a broken pair for the transmission of audio frequency intelligence at a relatively high fidelity and low cost. The present invention thus provides a one-way transmission system which is capable of operating on a single conductor against ground, such as the single conductor in a broken pair, without interfering with other intelligence being transmitted over other good pairs in the same telephone system.

Through the utilization of a frequency-modulated RF signal of a relatively low frequency, it is possible in the present invention to transmit low power signals over substantial distances such as are required in many types of applications, including information retrieval and wired music. Thus, while amplitude modulation and frequency modulation of RF carries have been known and understood for many years, and while the research and development of the telephone companying is so widespread and intensive as to be almost legendary, this invention, for the first time, has made it possible to utilize the good wires in broken-pair telephone lines, operating against ground, to transmit relatively high fidelity audio information over long distances.

It is, accordingly, a primary object of the present invention to provide a novel transmission system.

It is another object of the invention to provide a one-wire transmission system operating against ground.

It is another object of the invention to provide a low-power, low-cost transmission system for transmitting audio frequency intelligence for relatively long distances.

It is another object of the invention to provide a low-power transmission system making possible the use of broken-pair telephone lines to transmit high-fidelity audio frequencies over relatively long distances when utilizing the good lines in the broken pairs against ground.

It is another object of the invention to provide a low-power transmission system for transmitting audio frequency intelligence over the good wires in broken telephone pairs at RF frequencies without interfering with the signals on good pairs in the same cable.

It is still another object of the invention to provide a novel radio transmitter for use with one wire against ground.

It is still a further object of the invention to provide a novel radio receiver for use with one wire against ground.

These and further objects and advantages of the invention will become more apparent upon reference to the following specification and claims and appended drawings wherein:

Figure 1:
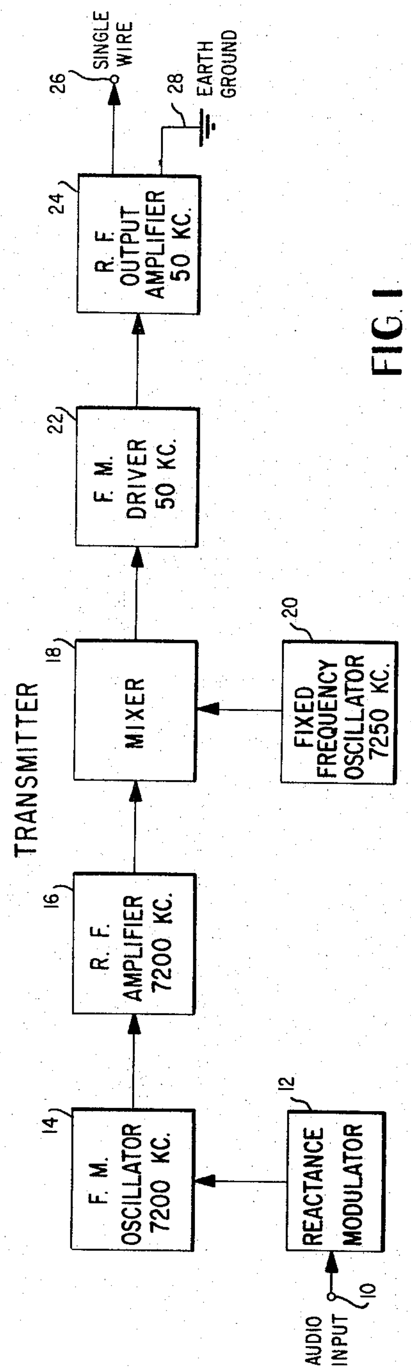
FIGURE 1 is a block diagram of a transmitter constructed according to the present invention.

Referring to the figures of the drawings more particularly, the transmission system of the present invention involves a transmitter, shown in block diagram in FIGURE 1, which includes an audio input terminal 10 connected to a reactance modulator 12. The reactance modulator 12 is connected into the circuit of a frequency-modulation oscillator 14 having a base frequency of 7200 kc. The frequency-modulated output of the FM oscillator 14 is fed to an RF amplifier 16 which in turn feeds a mixer 18. The mixer 18 also receives an input from a fixed frequency oscillator 20 operating at a frequency of 7250 kc.

The mixer 18 operates in a conventional manner and feeds an FM driver 22 which is tuned to the intermediate frequency of 50 kc. The FM driver 22 amplifies this 50 kc. signal and feeds it to an RF output amplifier 24 which provides the frequency-modulated output of the transmitter. As will be seen in FIGURE 1, this output is fed to a single wire 26 and to a conventional earth ground 28. The single wire 26 may consist of a good line in a broken-pair telephone line.

Figure 2:
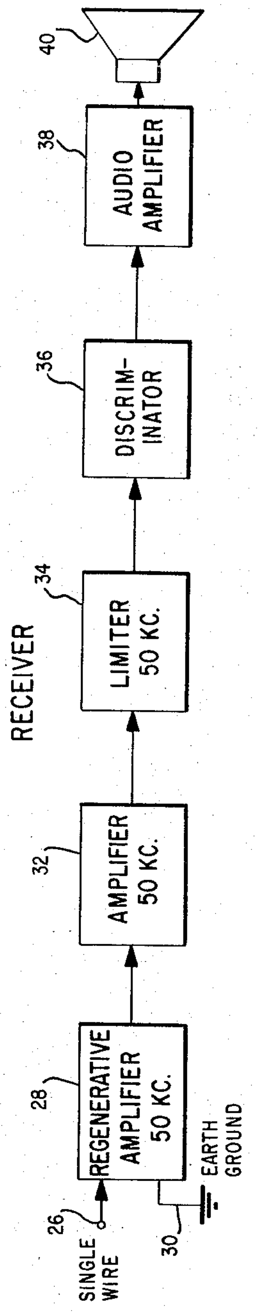
FIGURE 2 is a block diagram of a receiver constructed according to the present invention.

Referring to FIGURE 2, the receiver in the transmission system may consist of a regenerative amplifier 28 having its input terminals connected to the single wire 26 and to an earth ground 30. The amplifier 28 is tuned to 50 kc. but has a band-pass characteristic broad enough to provide a substantially flat response over the range of deviation of the frequency-modulated signal. The output of the regenerative amplifier 28 is fed through a second 50 kc. amplifier 32 having similar band-pass characteristics and thence to a limiter 34 of a conventional type. The output of the limiter is fed to a discriminator 36 which supplies an input to an audio amplifier 38 driving one or more speakers 40.

Figure 3:
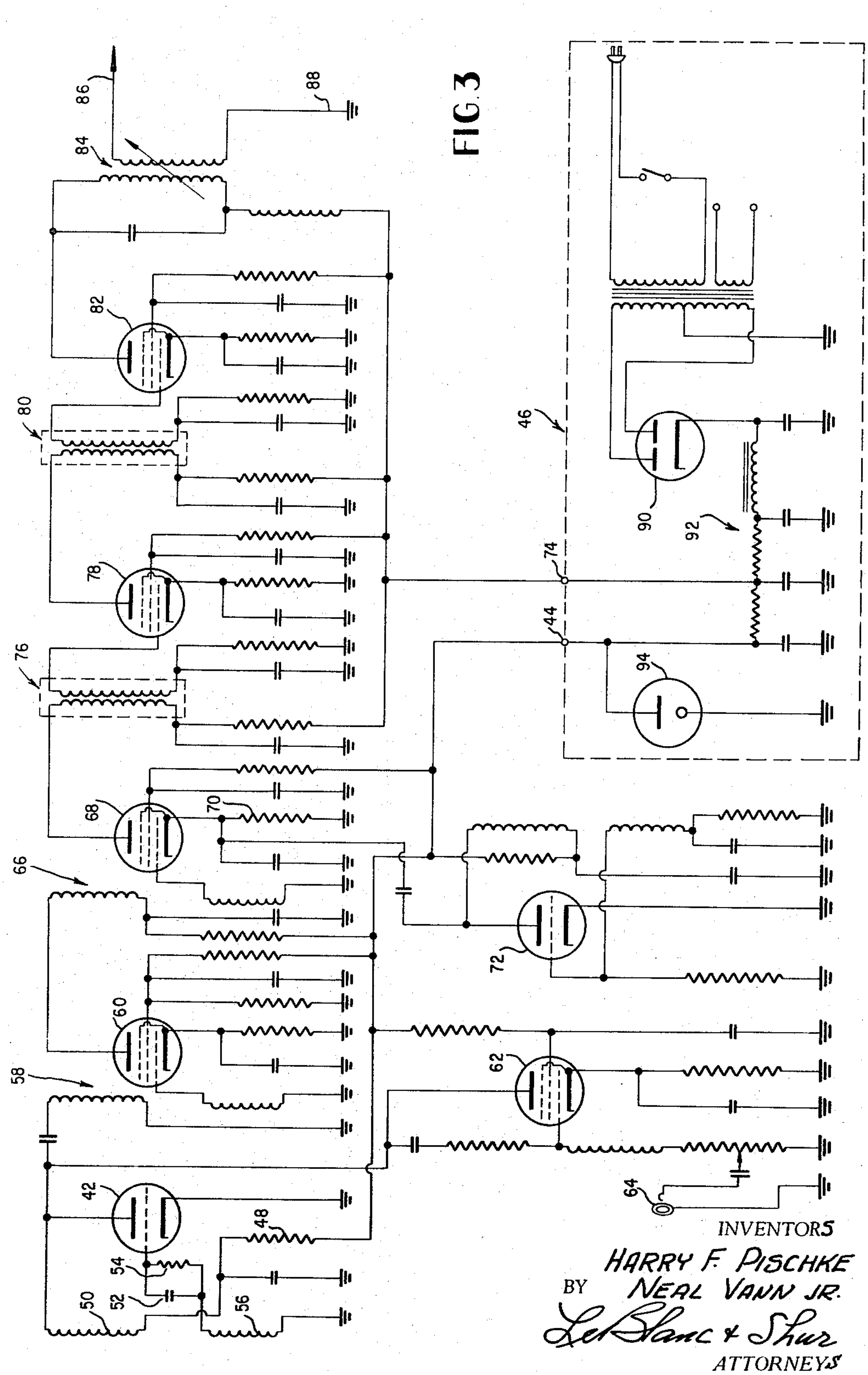
FIGURE 3 is a circuit diagram of a transmitter constructed according to one embodiment of the invention illustrated in FIGURE 1.

Referring to FIGURE 3, there is shown a circuit diagram of a transmitter constructed according to the embodiment of the invention illustrated in FIGURE 1. In this figure, there is seen an FM oscillator triode 42 which receives a regulated supply of positive potential from terminal 44 of the power supply indicated generally at 46. This potential supply connection is through the resistor 48 and coil 50 to the plate of the triode. The grid of the triode is connected through capacitor 52 and resistor 54 to coil 56 which is inductively coupled to the coil 50 to provide the feedback necessary for oscillation.

The output of the oscillator triode 42 is fed through a 7200 kc. coupling transformer 58 to the control grid of an RF amplifier 60. The reactance modulator tube 62 has its plate connected parallel to the plate of the FM oscillator 42 so that upon driving the reactance modulator 62 through audio input terminal 64, the frequency of the FM oscillator is caused to swing in accordance with the audio signal to produce frequency modulation. In a preferred embodiment of the invention, the oscillator 42 operates at a frequency of 7200 kc. and the reactance modulator 62 produces a plus or minus 4 kc. deviation for an audio range of 30–15,000 c.p.s. The construction of the transformer 58 is such as to provide a relatively flat band-pass for this deviation.

The plate of the RF amplifier 60 is also connected to the regulated voltage-supply terminal 44 through the primary of an interstage coupling transformer indicated at 66. The output of the transformer 66 feeds the control grid of a mixer tube 68. The other input to the mixer 68 is fed to its cathode resistor 70 from fixed oscillator 72 which, according to the illustrated embodiment of this invention, oscillates at a frequency of 7250 kc.

The plate of the mixer 68 receives a positive supply potential from terminal 74 of the power supply 46 through the primary of an interstage coupling transformer 76.

The secondary of coupling transformer 76 feeds the control grid of an RF driver tube 78 which delivers an output through the interstage coupling transformer 80. The plate of the driver 78 is coupled through the primary of transformer 80 to the voltage supply terminal 74.

The output of transformer 80 is fed to the control grid of an RF output amplifier 82 which feeds an output transformer 84. The plate of the tube 82 is also connected to the voltage supply terminal 74 through the primary of the transformer 84.

The output of transformer 84 has one terminal connected to a single line 86 such as the good line in a broken-pair telephone line, and the other terminal connected to an earth ground 88, the transformer 84 providing the desired impedance match between the single line to ground and the output of the transmitter. The interstage transformers 76, 80 and 84 are constructed in such a manner as to have a substantially flat band-pass over the frequency range 46–54 kc.

The power supply 46 comprises a conventional full-wave rectifier 90 feeding a suitable filter network 92 to provide the voltages at terminals 44 and 74. A voltage-regulator tube 94 provides the regulated voltage necessary on terminal 44.

Figure 4:
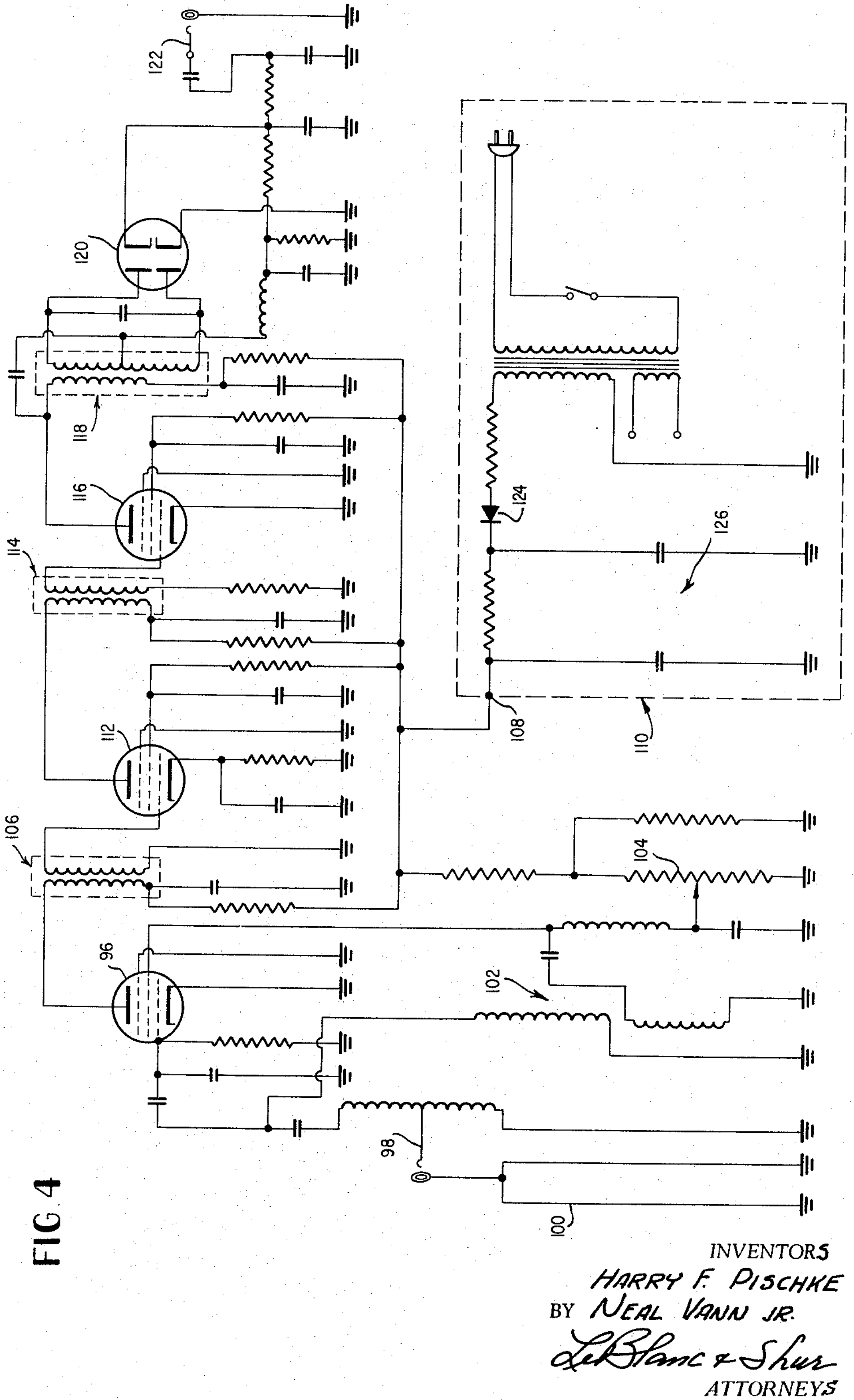
FIGURE 4 is a circuit diagram of a receiver constructed according to one embodiment of the invention and capable of use with the transmitter of FIGURE 3.

Referring to FIGURE 4, there is seen a specific embodiment of the receiver illustrated in block diagram in FIGURE 2. A regenerative amplifier tube 96 receives the 50 kc. frequency-modulated output of the transmitter from the single conductor 86 through an input terminal 98. The ground connection of the receiver is connected to an earth ground at 100. Feedback is provided in the regenerative amplifier 96 by means of a feedback transformer 102 with a regeneration control being provided at 104. The output of the regenerative amplifier 96 is fed back to the primary of an interstage transformer 106 with the plate of the regenerative amplifier tube 96 receiving a positive potential supply through the primary of that transformer and the output terminal 108 of a conventional power supply 110.

The output of interstage transformer 106 is fed to the control grid of a 50 kc. amplifier 112 which delivers an output to interstage transformer 114. The plate of this tube receives its positive supply potential through the primary of the transformer 114 from the terminal 108 of power supply 110.

The output of transformer 114 is fed to the control grid of a conventional limiter tube 116 which feeds the primary of a discriminator transformer 118. The discriminator transformer 118 is connected to a conventional double-diode discriminator tube 120 which provides an audio output at terminal 122. This is thence fed to a further conventional audio amplifier to actuate one or more speakers, as indicated in FIGURE 2.

The power supply 110 in FIGURE 4 constitutes a conventional half-way rectifier 124 feeding a filter network 126.

The specific oscillators 42 and 72 in the transmitter in FIGURE 3 and the reactance modulator may be substituted by other equivalent oscillators and reactance-modulator circuits and the variable reactance of the reactance modulator may be introduced into the grid circuit of the oscillator 42 rather than the plate, if so desired. In a similar manner, while the regenerative amplifier stage 96 in the receiver of FIGURE 4 provides a greater sensitivity and gain, it is possible to eliminate the regenerative stage if its gain is not needed, or, alternatively, it is possible to eliminate the regeneration and obtain the gain through cascaded amplifier stages.

Units constructed in accordance with the illustrated embodiment of the invention have been successfully built and tested with broken-pair telephone lines, and provided excellent fidelity for the reproduction of music and audio pulse tones against a ground return for distances of as much as seventeen miles. Distances of this nature are completely adequate for wired music systems. It will be appreciated that the equipment utilized in the invention is relatively low in cost and permits the usage of heretofore largely unused broken-pair telephone lines, at a tremendous saving in telephone tariff. As will be understood by those skilled in the art, it is possible to use a single good wire in a broken pair for the simultaneous transmission of a plurality of different signals by utilizing different carrier frequencies. The frequency of the carrier is preferably low and in the neighborhood of from 40 to 70 kilocycles.

While the system of the present invention has been described for use in conjunction with defective telephone cables utilizing the good wires of a broken pair, it is readily adaptable to other types of transmission over one line operating against an earth ground. Further, it will be obvious that, while major savings in telephone tariffs are available through the use of broken-pair telephone lines, it is also possible to effect a considerable reduction in telephone tariffs by using a good pair and using each line in the pair against ground to carry separate signals. In effect, this substantially doubles the number of programs that can be transmitted for a given pair of telephone lines. It will also be apparent to those skilled in the art that while this invention finds its primary usage in a one-line system operating against ground, it is also possible to substitute a wire for the ground connection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A high fiidelity audio transmission system comprising: a transmitter including an oscillator, means coupled to said oscillator for frequency modulating said oscillator with an audio frequency-modulating signal to produce a signal output from said oscillator frequency modulated by said audio frequency signal, a receiver, a telephone wire transmission line coupling said transmitter to said receiver, means in said transmitter for feeding said audio frequency-modulating signal from said oscillator to said transmission line on a carrier signal having a center frequency of approximately 40 to 70 kilocycles, the pass band of said feed means being substantially flat over an eight kilocycle frequency range, and detector means in said receiver for recovering the audio frequency modulation from said carrier signal.

2. A transmission system according to claim 1 wherein said transmitter and receiver are connected together by a transmission line having one side grounded to earth.

3. A transmission system according to claim 1 wherein said transmitter and receiver are connected together by a single wire to earth ground transmission line.

4. A transmission system comprising: means for generating an RF carrier in the megacycle range, means for frequency modulating said carrier in response to an audio signal to be transmitted, fixed oscillator means, mixer means receiving said frequency-modulated RF carrier and an output from said fixed oscillator means to produce a frequency-modulated intermediate frequency carrier in the range of 40 to 70 kilocycles, transmitter amplifying means for amplifying said intermediate frequency carrier, said amplifying means delivering an output to a single wire and an earth ground, receiver amplifying means connected to said single wire and an earth ground for receiving said modulated carrier, amplitude-limiter means receiving the modulated carrier from said receiver amplifying means, and discriminator means receiving the output of said limiter means and producing an output signal substantially the same as said signal to be transmitted.

References Cited

UNITED STATES PATENTS

| | | | |
|---|---|---|---|
| 1,629,685 | 5/1927 | Ditcham | 332—22 X |
| 2,634,367 | 4/1953 | Joseph | 329—129 |

OTHER REFERENCES

Pamphlet: "Introduction to Line Radio Communication," Signal Corps Radio Communication No. 41, G.P.O., January 1923, pp. 8 and 9 relied on.

Lensner et al.: "A Versatile Power Line Carrier System," A.I.E.E. Tech. Paper No. 44–34, December 1943, p. 4 and FIG. 5 relied on.

Radio Amateur's Handbook, 37th ed., 1960, pp. 338, 339, 341, 342 and 344 relied on.

JOHN W. CALDWELL, *Acting Primary Examiner.*